United States Patent [19]
Mittelstaedt

[11] 3,748,557
[45] July 24, 1973

[54] CIRCUIT FOR SHORT REVERSE OPERATION OF A MOTOR IN A DICTATING MACHINE OR THE LIKE

[75] Inventor: Rainer Mittelstaedt, Nuernberg, Germany

[73] Assignee: Grundig E.M.V, Furth/Bay, Germany

[22] Filed: July 19, 1972

[21] Appl. No.: 273,178

[30] Foreign Application Priority Data
Dec. 31, 1971 Germany.................... P 21 65 860.6

[52] U.S. Cl................................. 318/256, 318/293
[51] Int. Cl. ............................................. H02p 1/22
[58] Field of Search................... 318/256, 257, 264, 318/280, 283, 285, 289, 291, 293, 300, 139

[56] References Cited
UNITED STATES PATENTS 3,568,024  3/1971  Robbins.......................... 318/293 X
3,602,789  8/1971  Leistner.......................... 318/293 X
3,611,092  10/1971  Wilmunder..................... 318/293 X Primary Examiner—Bernard A. Gilheany
Assistant Examiner—W. E. Duncanson, Jr.
Attorney—Lewis H. Eslinger et al.

[57] ABSTRACT

A motor control circuit is shown having two transistors of opposite conductivity type connected in series between power supply terminals and with the motor connected between a switch and the common terminal of the transistors. The switch can be connected to either the positive or negative power supply terminals. An additional transistor is connected in a monostable multivibrator circuit with the transistor that is conductive during reverse operation of the motor. An additional switch connects a pulse to the monostable multivibrator when the main switch is set for forward rotation of the motor. This pulse puts the multivibrator into its unstable state to reverse current through the motor until the multivibrator returns to its stable state.

3 Claims, 2 Drawing Figures

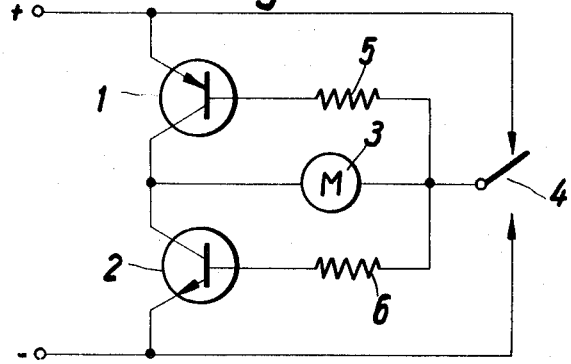
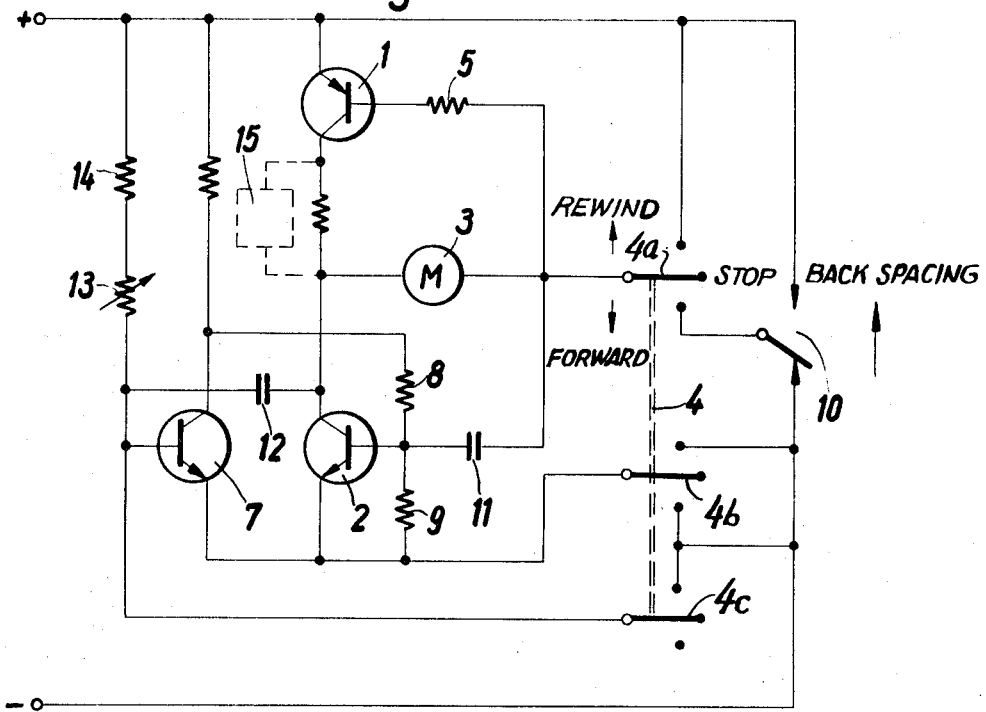

3,748,557

CIRCUIT FOR SHORT REVERSE OPERATION OF A MOTOR IN A DICTATING MACHINE OR THE LIKE

BACKGROUND OF THE INVENTION

1. Field of the Invention

This invention relates to momentary reverse operation of a direct current motor connected to a solid state circuit that controls the direction of current flow through the motor in response to actuation of a single-pole double-throw switch.

2. The Prior Art

In the copending application Ser. No. 264,029 filed June 19, 1972 and assigned to the assignee of the present application there is described a motor control circuit for causing a direct current motor to rotate in either direction. The circuit includes two transistors of opposite conductivity type connected in series with each other across the power supply terminals. The stationary terminals of the single-pole double-throw switch are also connected to the power supply terminals, and the motor to be controlled is connected between the arm of the switch and the common connection of the two transistors. When the switch is actuated in one direction, one of the transistors receives a bias on its base that allows it to conduct and draw emitter-collector current through the switch and through the motor in one direction. Moving the arm of the switch to the opposite terminal removes the conductive bias from the first transistor and connects the other transistor so that it is in a conductive state. Emitter-collector current from the second transistor flows in the opposite direction through the motor and through the arm of the switch causing the motor to run in the opposite direction.

In recorders used for dictation it is desirable to provide a multi-position switch to cause the motor to run in one direction for recording and playback, usually at a fixed relatively low speed. The switching means also has a setting that causes the motor to run in the reverse direction, usually at a higher speed, to rewind the tape. In addition, the person using the dictating machine will frequently wish to run the recording medium backward a short distance to replay the last few words. Heretofore, this momentary rewind, or back spacing operation, has been controlled by a relay which in turn was controlled by an electric RC delay module or by a mechanical counter device that operated by counting the number of revolutions of a shaft coupled with the reverse operation of the recording medium. Such apparatus for controlling the back spacing operation is comparatively expensive and bulky. A relatively large electrolytic capacitor is normally required if the RC module is used, and this is expensive and requires considerable space.

It is one of the objects of the present invention to provide a simple, inexpensive and compact circuit for obtaining back spacing operation of an electric motor when the circuit that controls the direction of rotation of the motor is set to drive the motor normally in the forward direction.

Further objects will be apparent from the following specification.

BRIEF DESCRIPTION OF THE INVENTION

In accordance with the present invention first and second transistors of opposite conductivity type are connected in series between one direct current power supply terminal and one movable arm of a multi-pole switch. One terminal of the motor is connected to a common terminal between the transistors and the other terminal of the motor is connected to a different arm of the same switch. The switch can be moved to at least two positions to cause one or the other of the transistors to conduct, depending upon which way the switch is actuated. Conduction of one of the transistors causes the motor to rotate in one direction and conduction of the other transistor causes the motor to rotate in the reverse direction. A third transistor is connected in a monostable multivibrator circuit with the reversing transistor, i.e., the transistor which is operative when the motor is running in the reverse direction. An additional single-pole double-throw switch is connected to the pole of the first switch through which current is supplied to the motor to cause the motor to rotate in the forward direction. When the additional switch is actuated for back spacing, an impulse signal is applied to the monostable multivibrator to cause the reversing transistor to become conductive until the end of the unstable state of the multivibrator. During this relatively short interval current is drawn through the motor to cause the motor to run in reverse. After the predetermined interval, the reversing transistor in series with the motor becomes non-conductive as the monostable multivibrator returns to its stable state.

BRIEF DESCRIPTION OF THE DRAWINGS

FIG. 1 is a simplified circuit diagram showing the basic arrangement of the circuit to control the direction of rotation of a direct current motor.

FIG. 2 is a circuit diagram of the basic circuit in FIG. 1 modified in accordance with the present invention.

DETAILED DESCRIPTION OF THE INVENTION

The circuit in FIG. 1 comprises two transistors 1 and 2 of opposite conductivity type having their emitter-collector circuits connected in series across the direct current power supply terminals. The polarity of these terminals is indicated by polarity symbols, and the transistors are polarized so that they can carry current from the source. The collectors of the two transistors 1 and 2 are connected together to one terminal of a direct current motor 3. Two current limiting resistors 5 and 6 are connected to the bases of the transistors 1 and 2 respectively. The resistors 5 and 6 and the other terminal of the motor 3 are connected together to the arm of a single-pole double-throw switch 4. The two fixed contacts of the switch 4 are connected to the two power supply terminals of the circuit.

In the operation of the circuit in FIG. 1, when the arm of the switch 4 is in the position shown in FIG. 1, the base of the transistor 2 is connected to the positive terminal of the power supply and thus the transistor 2 is able to conduct and to carry current from the positive terminal through the arm of the switch 4 and of the motor 3 to the negative terminal. In conventional terms, the current through the symbol for the motor 3 flows from right to left. The base of the transistor 1 is effectively short-circuited to the emitter of that transistor and thus the transistor 1 is non-conductive and does not effect current flow through the motor 3.

When the switch 4 is moved to the alternative position, the base of the transistor 2 is effectively short-circuited to its emitter and therefore this transistor is not conductive, but the base of the transistor 1 is connected to the negative terminal of the power supply which is the proper terminal to make the transistor 1 become conductive. Current flows from the positive terminal of the power supply through the emitter-collector circuit of the transistor 1, the motor 3, and the arm of the switch 4 to the negative terminal of the power supply. In so doing, the current is conventionally indicated as flowing through the motor 3 from left to right, which is the opposite direction from that previously described. One direction of current flow is designated as the forward current for the motor 3 and the other as the reverse current, corresponding to the two directions of rotation of the motor.

The foregoing description applies to a motor having a permanent magnet for the exciter. If the motor is of the type in which the excitation field is furnished by a winding on an electromagnetic structure, reference numeral 3 applies only to the excitation winding or to the armature winding as necessary to effect reversal of the rotation in response to reversal of the current.

FIG. 2 illustrates a motor circuit according to the present invention with means for providing a momentary reverse operation of the motor 3. In FIG. 2 the transistors 1 and 2 of opposite conductivity type are connected in series and a common terminal between them is connected to one terminal of the motor 3. The switch 4 in FIG. 2 has three poles 4a – 4c and each of the poles moves to three different positions. They are shown in the position in which the motor 3 is stopped. In addition the poles may be moved in one direction to the position corresponding to forward rotation of the motor. Alternatively, the arms may be moved to another position in which the motor 3 runs in the reverse direction. The current limiting resistor 5 is connected between the arm 4a of the switch and the base of the transistor 1.

The transistor 2, which is the transistor that carries current while the motor is running in reverse, is connected as part of a monostable multivibrator with a transistor 7. The collector of the transistor 7 is connected to the positive terminal by way of a load resistor and is connected by means of a voltage divider comprising the resistors 8 and 9 to the base of the transistor 2. The monostable multivibrator circuit is put into operation by means of a single-pole double-throw switch 10 the arm of which is connected to the forward fixed terminal to be engaged by the arm 4a. A capacitor 11 connects the base of the transistor 2 to the common terminal of the motor 3 and the arm 4a. The collector of the transistor 2 is connected by a capacitor 12 to the base of the transistor 7 which receives a bias by way of a variable resistor 13 and a fixed resistor 14 connected to the positive terminal of the power supply. The bias thus applied to the transistor 7 causes that transistor to be normally conductive.

When the motor 3 in FIG. 2 is to be operated in a forward direction, the switch 4 is actuated to cause the arms 4a – 4c to pivot downwardly with respect to the position shown in the drawing. This causes the arm 4a to connect with the terminal connected to the switch 10. Normally the arm of the switch 10 is in the position shown. At the same time, the arm 4b connects the emitters of the transistors 2 and 7 to the negative power supply terminal so that the circuit for operation of the motor 3 is essentially the same as the simplified circuit in FIG. 1. A bias is applied through the switch 10 and the arm 4a to cause the transistor 1 to be conductive. This allows current to flow from the positive terminal of the power supply through the emitter-collector circuit of the transistor 1, through the motor 3, through the switch arm 4a, and through the switch 10 to the negative terminal of the power supply to cause the motor to run in the forward direction.

The monostable multivibrator comprising the transistors 2 and 7 is in its stable state in which the transistor 7 is conductive due to bias received by way of the resistors 13 and 14. The transistor 2 is non-conductive because its base is connected to the collector of the transistor 7, which is at a low voltage level during conduction. When it is desired to cause the motor 3 to run momentarily in the opposite direction for back spacing, the arm of the switch 10 is moved to the alternative contact. This causes the transistor 1 to become non-conductive so as to stop the flow of current through the motor 3. At the same time, a positive impulse is applied by way of the capacitor 11 to the base of the transistor 2. This impulse causes the transistor 2 to become conductive, which drops its collector to a low voltage level. This drop in level is connected by way of the capacitor 12 to the base of the transistor 7 and causes the latter transistor to become non-conductive. Thus, the multivibrator is placed in its unstable state. In this state current can flow through the motor 3 in the reverse direction and through the emitter-collector circuit of the transistor 2 and the arm 4b of the switch 4 to a negative terminal of the power supply.

The multivibrator remains in this unstable state until a time has elapsed that is determined by the time constant comprising the capacitor 12 and the resistors 13 and 14. The end of the unstable state is reached when the capacitor 12 has charged enough so that the transistor 7 can become conductive again, thereby causing a drop in the voltage on its emitter and a drop in the voltage on the base of the transistor 2 to a low level, which causes the transistor 2 to become non-conductive. The duration of the unstable state of the multivibrator can be controlled by the variable resistor 13.

Even if the arm of the switch 10 is held in its upper position for an indefinite period of time the operation of the multivibrator will not be affected because only the initial momentary impulse will be transmitted through the capacitor 11. A steady state condition in which the arm of the switch 10 was held in connection with the positive terminal of the power supply would not pass through the capacitor 11.

On the other hand, if the arm of the switch 10 is returned to the position shown in FIG. 2 at a time earlier than the normal end of the unstable state of the multivibrator a negative impulse will be applied to the base of the transistor 2 by way of the capacitor 11. This impulse causes the transistor 2 to become non-conductive immediately and stops the flow of reverse-rotation current through the motor 3. The transistor 1 is returned to its conductive state at the same time.

For continuous reverse operation of the motor 3 the switch 4 is actuated to place the arms 4a – 4c in their upper positions. The arm 4a effectively shorts out the input circuit of the transistor 1 and connects one terminal of the motor 3 to the positive terminal of the power supply. The arm 4c connects the base of the transistor 7 to the negative terminal of the power supply thus rendering the transistor 7 non-conductive and allowing the transistor 2 to conduct. Current carried through the emitter-collector circuit of the transistor 2 is the same current that passes through the motor 3 with the correct polarity to cause the motor 3 to run in the reverse direction.

Although the motor 3 is spoken of as being connected to a common terminal between the transistors 1 and 2 there may be a circuit 15 connected between this terminal and the collector of the transistor 1 to cause the motor 3 to operate at a constant speed when running in the forward direction. The constant speed circuit 15 need only be placed in the circuit of the transistor 1 that is operative during forward rotation of the motor since it is not necessary to control the speed of the motor during reverse rotation. The extra impedance between the motor 3 and the collector of the transistor 1 limits and controls the current through the motor and thus limits and controls the speed of the motor. Since the current that operates the motor 3 in the reverse direction is not similarly limited by an impedance in series with the emitter-collector circuit of the transistor 2, the motor will normally run faster in reverse than in the forward direction.

What is claimed is:

1. A circuit for controlling the direction of rotation of a direct current motor, said circuit comprising:
   A. positive and negative direct current power supply terminals;
   B. a direct current motor comprising first and second terminals to receive direct current to cause the motor to run in either direction according to the direction of flow of said current;
   C. first and second transistors of opposite conductivity type having their emitters connected to said positive and negative power supply terminals, respectively, and their collectors connected to an intermediate terminal and to said first terminal of said motor, whereby the emitter-collector circuits of said transistors are connected in current-carrying polarity between said power supply terminals;
   D. first switching means connected to said second terminal of said motor to connect said second terminal alternatively to said positive and negative terminals, the base electrode of said first transistor being connected to said switching means to make said first transistor conductive when said switching means is connected to one of said power supply terminals and non-conductive when said switching means is connected to the other of said power supply terminals;
   E. second switching means connected to said first switching means to make said first transistor non-conductive when said first transistor is made conductive by said first switching means; and
   F. circuit means connected to the base of said second transistor to cause said second transistor to become conductive when said first transistor is made non-conductive by said first switching means and to become temporarily conductive when said first transistor is made non-conductive by said second switching means, said circuit means comprising:
      1. a third transistor connected to said second transistor so as to form a monostable multivibrator which is stable when said third transistor is conductive and said second transistor is non-conductive, said third transistor being held non-conductive by said first switching means when said first transistor is made non-conductive by said first switching means, and
      2. a capacitor connected in series between the base of said second transistor and said second terminal of said motor so as to set said monostable multivibrator to its unstable state when said first transistor is made non-conductive by said second switching means.

2. The motor control circuit of claim 1 in which said monostable multivibrator comprises a time constant to control the duration of the time that said monostable multivibrator remains in its unstable state, said time constant comprising a variable resistor.

3. The motor control circuit of claim 1 comprising, in addition, third switching means connected to said first switching means to operate simultaneously therewith and electrically connected to said third transistor to render said third transistor non-conductive when said first and third switching means are switched to a condition to cause said motor to run continuously in reverse.

* * * * *